United States Patent [19]

Tajima

[11] Patent Number: 4,458,566
[45] Date of Patent: Jul. 10, 1984

[54] FLEXIBLE LOADER APPARATUS FOR MACHINE TOOLS AND METHOD FOR USE THEREOF

[75] Inventor: Masaharu Tajima, Kawasaki, Japan
[73] Assignee: Ikegai Tekko Kabushiki Kaisha, Tokyo, Japan
[21] Appl. No.: 296,273
[22] PCT Filed: Apr. 7, 1981
[86] PCT No.: PCT/JP81/00078
§ 371 Date: Aug. 26, 1981
§ 102(e) Date: Aug. 26, 1981
[87] PCT Pub. No.: WO81/02991
PCT Pub. Date: Oct. 29, 1981

[30] Foreign Application Priority Data

Apr. 22, 1980 [JP] Japan .................................. 55-52332

[51] Int. Cl.³ .............................................. B23B 15/00
[52] U.S. Cl. ............................................ 82/2.5; 74/469; 82/2.7; 414/4; 414/728; 414/735
[58] Field of Search .................... 414/4, 728, 735; 82/2.5, 2.7; 74/469

[56] References Cited

U.S. PATENT DOCUMENTS

| | | | |
|---|---|---|---|
| 2,861,701 | 11/1958 | Bergsland et al. | 279/1 TS |
| 3,066,805 | 12/1962 | Sullivan | 414/735 |
| 3,247,979 | 4/1966 | Melton et al. | 414/735 |
| 3,272,347 | 9/1966 | Lemelson | 414/735 |
| 3,482,711 | 12/1969 | Bohme et al. | 414/728 |
| 3,495,721 | 2/1970 | Bownass | 414/728 |
| 3,744,125 | 7/1973 | Schalles | 82/2.7 |
| 3,759,563 | 9/1973 | Kitamura | 414/4 |
| 3,784,031 | 1/1974 | Niitu et al. | 414/735 |
| 3,790,002 | 2/1974 | Germond et al. | 414/735 |
| 3,817,403 | 6/1974 | Glachet et al. | 414/735 |
| 3,896,940 | 7/1975 | Birrell | 414/728 |
| 4,061,062 | 12/1977 | Peltier | 414/728 |
| 4,259,876 | 4/1981 | Belyanin et al. | 74/469 |
| 4,312,618 | 1/1982 | Greene | 82/2.7 |
| 4,317,394 | 3/1982 | Link et al. | 82/2.5 |
| 4,345,866 | 8/1982 | Greene | 414/728 |

Primary Examiner—Leonidas Vlachos
Assistant Examiner—Jerry Kearns
Attorney, Agent, or Firm—Wenderoth, Lind & Ponack

[57] ABSTRACT

A flexible loader apparatus as used for supplying a workpiece to or removing a machined workpiece from a machine tool is provided which has a base (6) secured to a headstock (5) of the machine tool, slides (7,8) shiftable in a direction parallel to the axial line (9) of the main spindle of the headstock (5) guided by the guide member (10) of the base (6), a first servo-motor (16) to move the slides (7, 8), an arm (18) supported at its one end on the slides (7, 8) at their one ends so as to be rotatable about a second axial line (17) parallel to the axial line (9) of the main spindle, a second servo-motor (26) to rotate the arm (18), a wrist member (21) supported by the arm (18) at its free end so as to be rotatable about a third axial line (20) parallel to the axial line (9), a hand member (23) supported by the wrist member (21) so as to be rotatable about an axial line (22) orthogonal to the third axial line (20), fingers (25) mounted to the hand member (23) and adapted to be opened and closed by a fluid cylinder (24), and a third and fourth servo-motors (11, 12) mounted to the slides (7, 8) at their other ends and adapted to be operated to rotate the wrist member (21) and the hand member (23), respectively, through a transmitting system contained within the slide (7) and the arm (18), whereby the fingers (25) are adapted to occupy a position near a chuck (3) of the headstock (5) and a position near a conveyor (28) arranged in the proximity of the machine tool for the purpose of carrying workpieces to be machined or machined workpieces.

9 Claims, 25 Drawing Figures

FLEXIBLE LOADER APPARATUS FOR MACHINE TOOLS AND METHOD FOR USE THEREOF

TECHNICAL FIELD

The present invention relates to a loader apparatus for machine tools, and more particularly to a flexible loader apparatus for machine tools to be built therein or separately installed to be associated therewith to automatically supply workpieces thereto or to automatically extract machined workpieces therefrom, as well as to a method for the use thereof.

BACKGROUND ART

It has hitherto been known to use industrial robots, etc. to automatically feed workpieces to machine tools or to extract machined workpieces therefrom in order to achieve a continuous machining operation with the machine tools. However, it is a wellknown fact that this procedure has several disadvantages.

That is, in the conventional industrial robots, in order to prevent a wrist member mounted to the end of an arm and a hand member mounted to the wrist member, from relative movement therebetween so that the wrist member can perform an operation independently of the hand member, the arm must be provided near the wrist member with a differential gear. However, this makes the construction near the wrist member complicated, large and heavy so that problems arise with regard to maneuverability, safety and reliability. Further, since such industrial robots are required to be installed separately from the machine tools additional floor space is required for the robots and they may interfere with an operator's work such as the exchange of cutting tools, etc. Further the operational range of the robot partially overlaps with that of the operator so that questions in terms of safety in operation arise. Moreover, although it is necessary to alter the operation of the robot according to the shape, dimensions, etc. of a workpiece to be machined, the procedure for changing the robot's operation is very complicated and usually takes a considerable amount of time to achieve, even when carried out by a person familiar with the task.

DISCLOSURE OF THE INVENTION

It is an object of the present invention to provide a flexible loader apparatus for machine tools which allows the automatic feed or removal of workpieces to or from machine tools.

It is another object of the present invention to provide a flexible loader apparatus for machine tools which has excellent maneuverability, and exhibits a high degree of safety and is also high in reliability.

It is a further object of the present invention to provide a flexible loader apparatus for machine tools which requires a relatively small area for installation and does not interfere with the work to be carried out by an operator, such as the exchange of cutting tools, etc.

It is still a further object of the present invention to provide a double hand device in a flexible loader apparatus for machine tools which allows the automatic supply of workpieces to the machine tool and the withdrawal of machined workpieces therefrom to be achieved very quickly.

It is one of the other objects of the present invention to provide a method for the use of the flexible loader apparatus for machine tools according to the present invention which allows a rapid change in its operation within a relatively short period of time.

In accordance with the present invention a flexible loader apparatus for machine tools is provided which comprises a base adapted to be built in a headstock of the machine tool or mounted near a main spindle thereof, or mounted on a stand to be installed near the machine tool on a suitable foundation, slides mounted to the base so as to be shiftable in a direction in parallel with the axial line of the main spindle, an arm mounted at its base end to the slide at its one end so as to be rotatable about the axial line of the slide, a wrist member mounted to the arm at its free end so as to be rotatable about an axial line in parallel with the axial line of the main spindle, a hand member mounted to the wrist member so as to be rotatable about an axial line orthogonal to the axial line of the main spindle, a pair of finger members mounted to the hand member generally in a direction orthogonal to the axial line of the main spindle so as to be opened and closed, and a driving mechanism for the arm as well as a transmission system for the wrist member and the hand member, whereby the arm, the wrist member, the hand member and the finger members are adapted to be cooperatively operated such that the finger members can grasp a workpiece carried on a workpiece transfer conveyor laid outside the machine tool, to supply it to a workpiece chuck element of the machine tool and/or to remove a machined workpiece therefrom to transfer it back onto the conveyor.

According to the present invention a method for use of the flexible loader apparatus for machine tools in accordance with the present invention is also provided wherein a ROM (Read Only Memory) for providing a preset operation command, and a RAM (Random Access Memory) provided with input and output modification commands in accordance with an operation modification command issued during the issue of the preset operation command, are connected to a microcomputer to control the operation of the flexible loader apparatus, a predetermined memory location being prepared in the RAM in accordance with the number of the operation modification demand so that a plurality of operational axes of the flexible loader and the amounts of their operations are memorized in the prepared memory location for the respective operational axes, and the modification operation is carried out in accordance with the order of the operational axes and the amounts of their operations.

In the present invention it is also contemplated to provide a double hand device for the flexible loader apparatus in which two pairs of finger members are mounted to the hand member so that a workpiece to be machined and a machined workpiece can be independently grasped by the hand members, resulting in a substantial decrease in the time required for the exchange of workpieces in the chuck mechanism of the machine tool.

BRIEF DESCRIPTION OF THE DRAWINGS

Other objects of the present invention and the invention itself will become more readily apparent by reference to the following specification and drawings, in which drawings:

FIGS. 9A to 9K are views disclosing the successive operational stages of the flexible loader apparatus shown in FIGS. 3 to 8;

BEST MODE OF CARRYING OUT THE INVENTION

Figure 1:
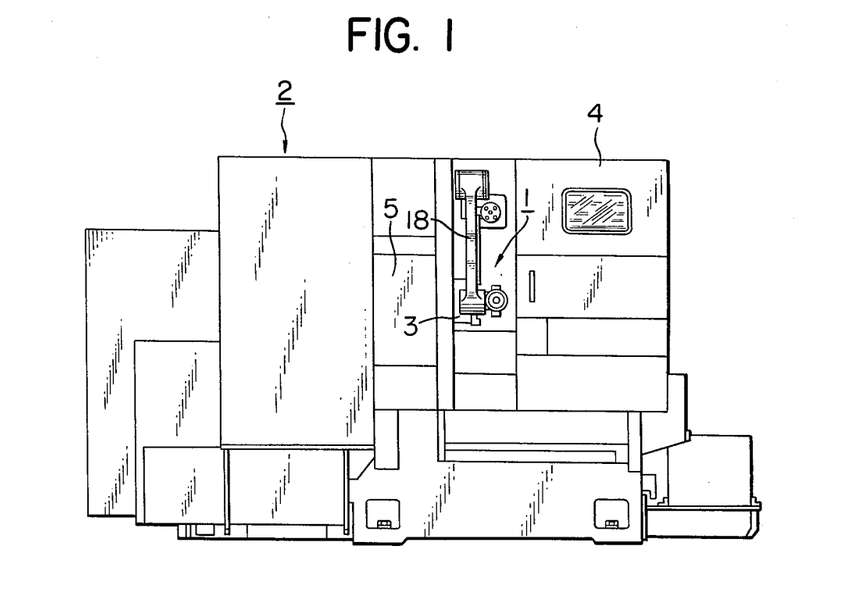
FIG. 1 is a front elevational view of a digitally controlled lathe in which one embodiment of the flexible loader apparatus according to the present invention is installed.
Figure 2:
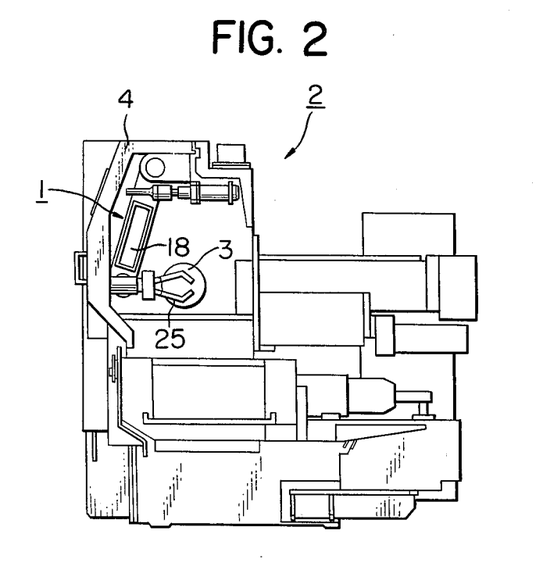
FIG. 2 is a side elevational view of the lathe shown in FIG. 1.
Figure 3:
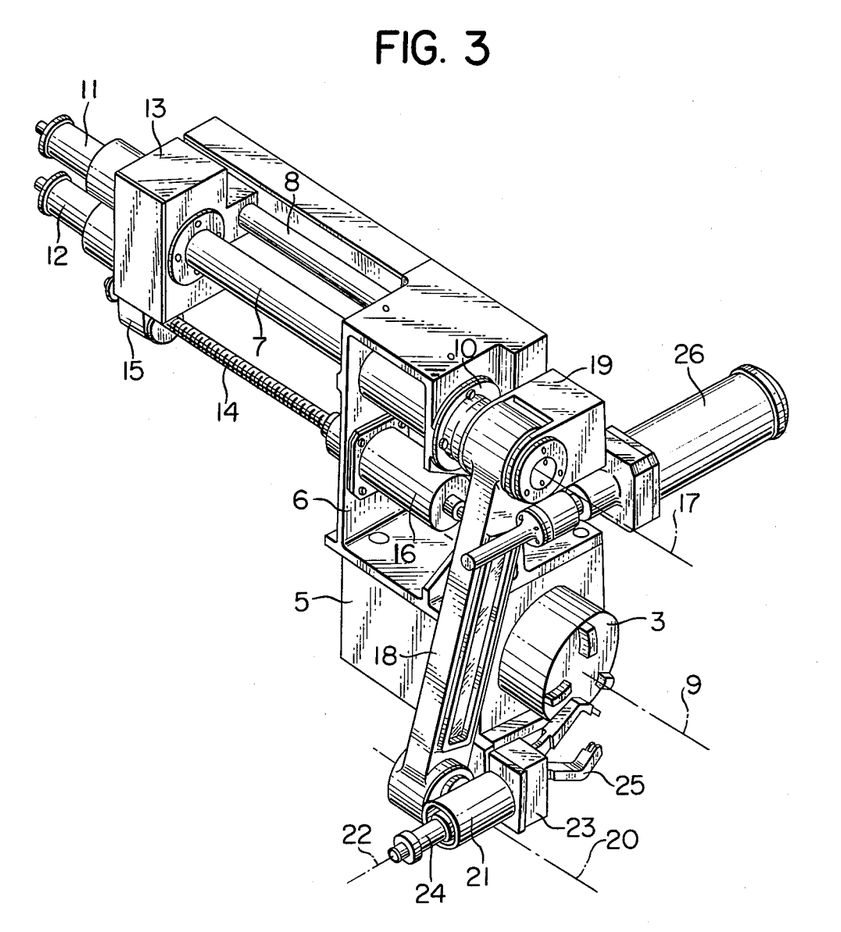
FIG. 3 is a perspective view of the flexible loader apparatus shown in FIGS. 1 and 2.
Figure 4:
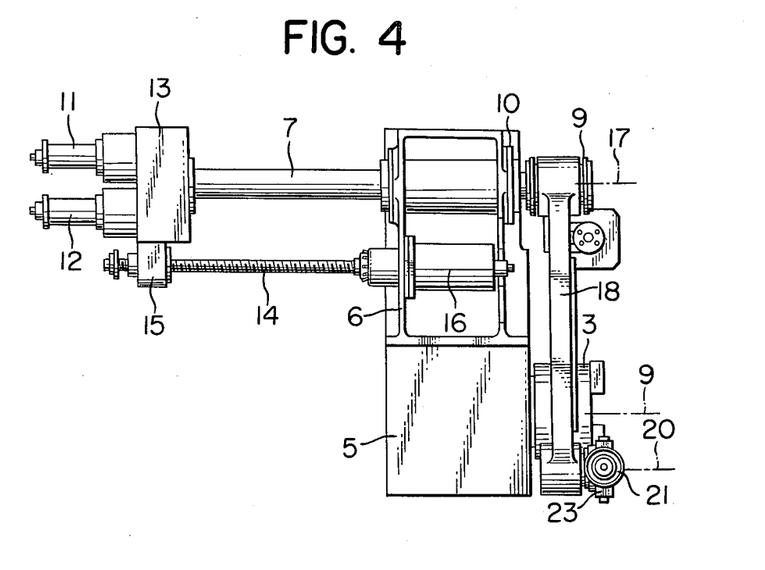
FIG. 4 is a front elevational view of the flexible loader apparatus shown in FIG. 3.

Now the first embodiment of the present invention will be explained in reference to FIGS. 1 to 9 of the attached drawings. In FIGS. 1 and 2 there is shown a digitally controlled lathe 2 in which a flexible loader apparatus 1 according to the present invention is installed. The flexible loader apparatus 1 is arranged within a splash guard 4 which shields the machining area of the lathe 2 in which a workpiece is clamped by means of a chuck 3 to machine it.

The loader apparatus is shown in detail in FIGS. 3 to 6. As shown, fixedly secured by means such as bolts, to a headstock 5 of the lathe 2 in which a main spindle having the chuck 3 at its forward end is rotatively journaled, is a base 6 which carries a guide member 10 adapted to shiftably guide a hollow slide 7 in a direction parallel to the axial line 9 of the main spindle of the lathe 2, the base also shiftably carrying a slide 8 in parallel with the slide 7.

Mounted to the slides 7 and 8 at one end of each thereof are servomotors 11 and 12 as well as a gear box 13 to transmit outputs from these, to be further described below, after the speeds have been stepped up or down. A threaded shaft 14 such as a ball screw or the like and a nut 15 in mesh therewith are mounted to the underside of the gear box 13. The threaded shaft 14 is adapted to be rotated by a servo-motor 16 fixedly secured to the base 6 so that the slides 7 and 8 are moved forwards or backwards with the rotation of the shaft 14 by the servo-motor 16. Mounted to the slides 7 and 8 at their respective other ends is a member 19 which is adapted to carry an arm 18 at its base end so as to be rotatable about the axial line 17 of the slide 7. At the free end portion of the arm 18 a wrist member 21 is mounted so as to be rotatable about an axial line 20 in parallel with the axial lines 9 and 17. The wrist member 21 carries a hand member 23 which is rotatable about an axial line 22 orthogonally intersecting the axial line 20. The hand member 23 carries a pair of finger members 25 which are adapted to be opened and closed by means of a cylinder 24 secured to the wrist member 21. The arm 18 is adapted to be rotated by a servo-motor 26 fixedly secured to the member 19, and the wrist member 21 and the hand member 23 are adapted to be driven by the abovesaid servo-motors 11 and 12, respectively, through the gear box 13, slide 7, and a transmission system comprising shafts, gears, chains, sprocket wheels, etc. contained within the slide 7 and the arm 18.

Figure 6:
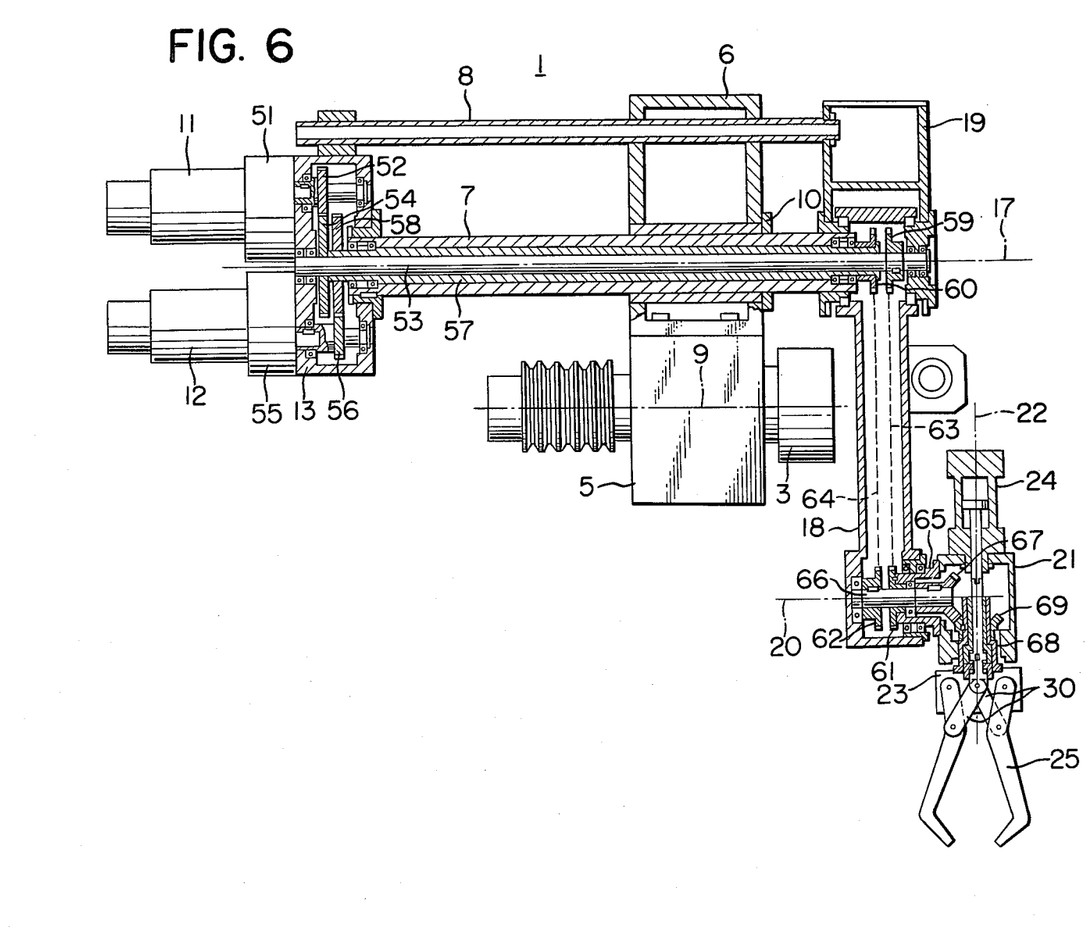
FIG. 6 is a longitudinal sectional view of the flexible loader apparatus shown in FIGS. 3 to 5, disclosing the transmission system therefor.

The transmission system is shown in detail in FIG. 6. As shown, the output shaft of the servo-motor 11 is drivingly connected to a gear 52 within the gear box 13 through a reduction gear box 51, the gear 52 being in mesh with a gear 54 which is mounted to a shaft 53 at its one end the shaft 53 extending through the hollow slide 7. The output shaft of the servo-motor 12 is drivingly connected to a gear 56 within the gear box 13 through a reduction gear box 55, the gear 56 being in mesh with a hollow shaft 57 at its one end, and the shaft 53 extending coaxially within the hollow shaft 57. Secured to the shaft 53 and the hollow shaft 57 at their other ends are sprockets 59 and 60, respectively, within the arm 18, the sprockets 59 and 60 being operatively connected to sprockets 61 and 62, respectively, arranged within the arm 18 at its lower end portion on the axial line 20, through chains 63 and 64, respectively, disposed axially within the arm 18, the sprocket 61 being mounted to a hollow shaft 65 at its one end and the shaft 65 is rotatively journaled within the arm 18 so as to be rotatable about the axial line 20, the wrist member 21 being secured to the hollow shaft 65 at its other end. The sprocket 62 is secured to a shaft 66 at its one end and the shaft 66 is rotatively received within the hollow shaft 65, and the other end has fixedly secured thereto a bevel gear 67 which in turn meshes with a bevel gear 69 which is mounted to a further hollow shaft 68 at its one end, the shaft 68 being mounted within the wrist member 21 so as to be rotatable about the axial line 22, and the hand member 23 is fixedly secured to the shaft 68 at its other end portion so as to be located near one end of the wrist member 21. The piston rod of the cylinder 24 secured to the wrist member 21 at the end remote from the hand member 23 extends through the hollow space of the shaft 68 and is connected to the finger members 25 through a suitable linkage 30. It will be apparent that, upon operation of the servo-motors 11 and 12, the wrist member 21 and the hand member 23 can be rotated about the axial lines 20 and 22, respectively. It should also be noted that, if the wrist member 21 is rotated about the axial line 20 by the operation of the servo-motor 11 only with the servo-motor 12 at a standstill, the bevel gear will become a planetary gear with respect to the bevel gear 67 and the hand member 23 will be simultaneously rotated about the axial line 22. That is, since the bevel gear 67 is fixed and the bevel gear 69 in mesh therewith is revolved together with the wrist member 21, the bevel gear 69 is caused to be rotated about the axial line 22 together with the hand member 23. Therefore, in order to rotate only the wrist member 21 without rotating the hand member 23 it is necessary to actuate the servo-motor 12 also, to rotate the shaft 66 in the same direction as the direction of rotation of the hollow shaft 65 and at the same velocity as the shaft 65. By so doing, since no relative rotation takes place between the bevel gears 67 and 69, the hand member 23 does not rotate. Thus, the operation is simplified and the maneuverability is improved. Further, it is preferable that the velocity ratio between the sprockects 59 and 61 and that between the sprockets 60 and 62 be selected so as to be equal. This can be easily accomplished by making the number of teeth on each of these four sprockets the same. By adopting such measures, since the rotation of the sprockets 61 and 62 caused by the rotation of the arm 18 about the axial line 17 becomes equal, no relative movement is generated between the wrist member 21 and the hand member 23. Further, it is preferable that the reduction ratios of the gear boxes 51 and 55 be made equal, and that the gear ratio between the gears 52 and 54, as well as that between the gears 56 and 58, be made equal. By so doing, whenever the servo-motor 11 is actuated, the same pulses are given to the servo-motor 12 in the same direction, the shaft 66 and the hollow shaft 65 are able to achieve identical rotation, so that no relative rotation between the wrist member 21 and the hand member 23 occurs.

Figure 7:
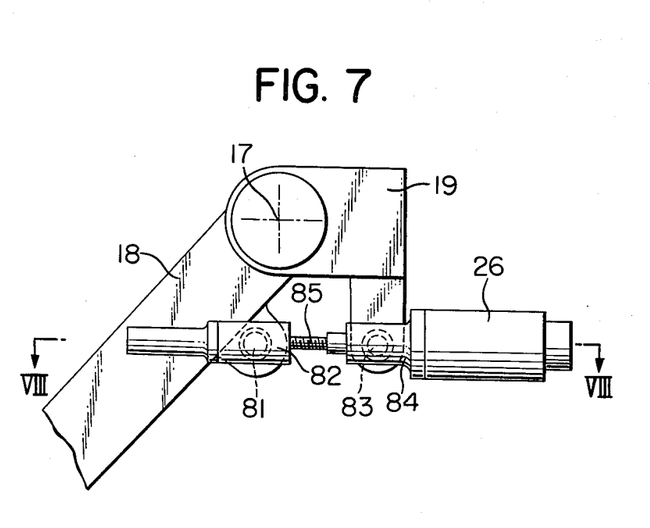
FIG. 7 is a partial side elevational view to show the drive mechanism for the arm shown in FIG. 3.
Figure 8:
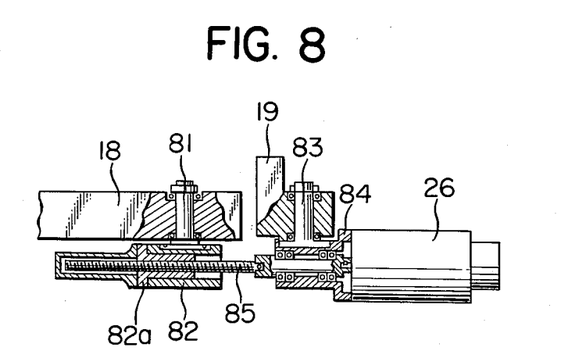
FIG. 8 is a sectional view taken along the line VIII—VIII of FIG. 7.

Next, the driving mechanism for the arm 18 will be explained in reference to FIGS. 7 and 8.

As shown in the drawings the arm 18 is provided with a first pivot 81 having an axis parallel to the axial line 17, a nut assembly 82 being mounted to the end of the pivot 81. The member 19 which rotatively carries the arm 18 at its base portion is provided with a second pivot 83 having an axis in parallel with the axial line 17, a servo-motor 25 being mounted to the pivot 83 through a bracket 84. Fixedly secured to the shaft of the servo-motor 26 is a threaded rod 85 which is in mesh with the nut assembly 82. Thus, upon rotation of the servo-motor 26, the rod 85 rotates to move the nut assembly 82, whereby the arm 18 is rotated about the axial line 17. Since this construction makes the overall dimensions of the driving mechanism for the arm 18 small, the maneuverability and operability of the machine tool are not affected even through the flexible loader apparatus according to the present invention is installed within the splash guard 4.

Figure 5:
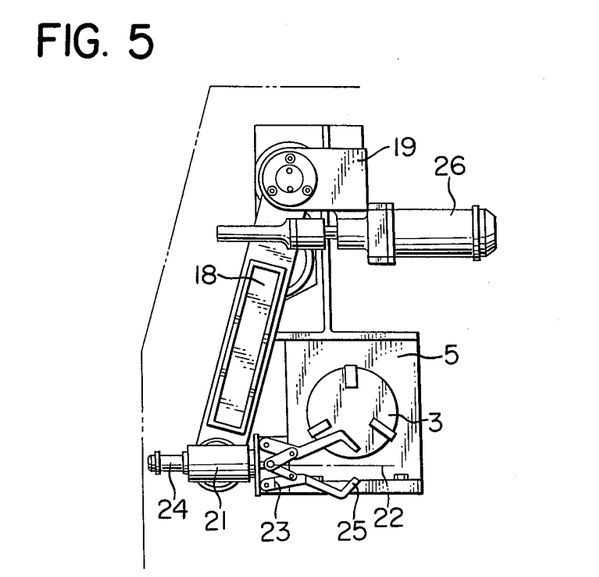
FIG. 5 is a side elevational view of the flexible loader apparatus shown in FIG. 4.
Figure 9A:
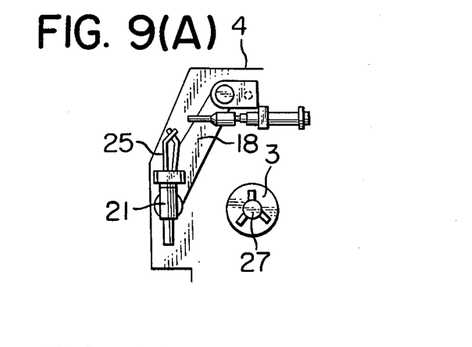
Figure 9B:
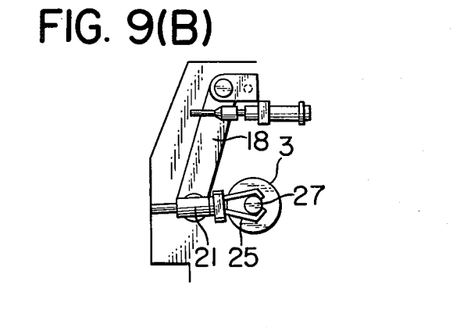
Figure 9C:
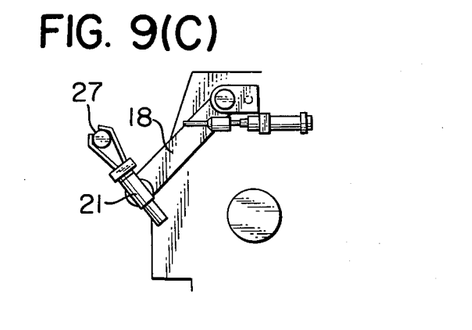
Figure 9D:
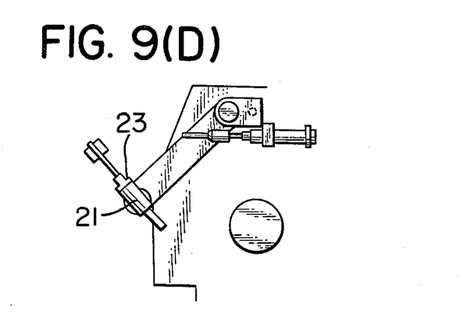
Figure 9E:
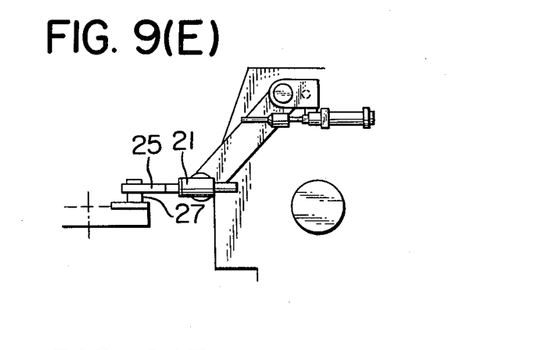
Figure 9F:
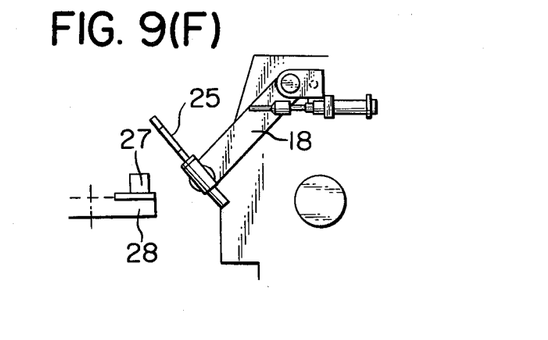
Figure 9G:
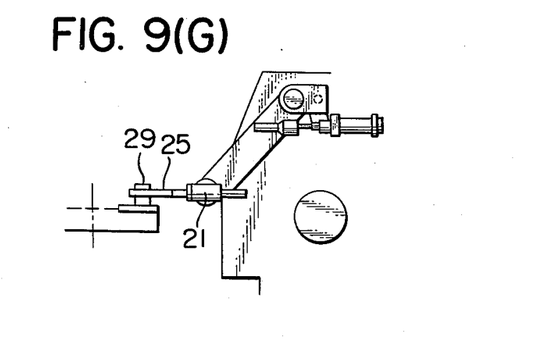
Figure 9H:
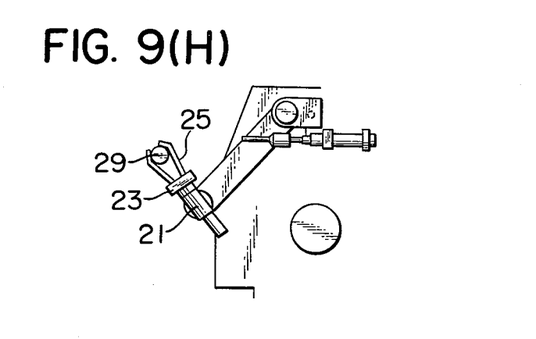
Figure 9I:
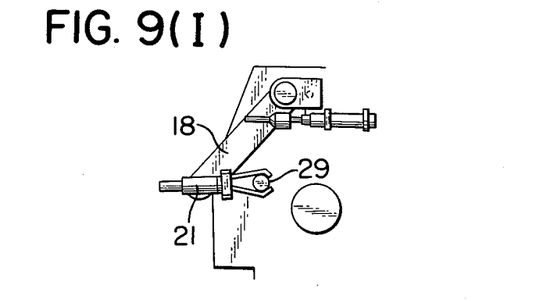
Figure 9J:
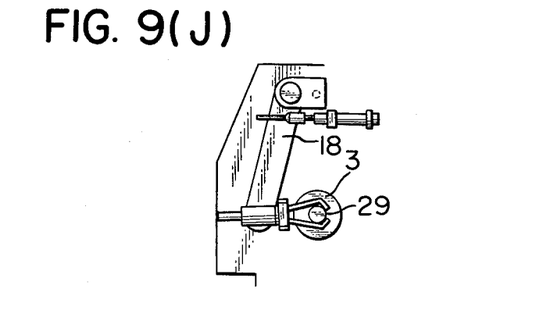
Figure 9K:
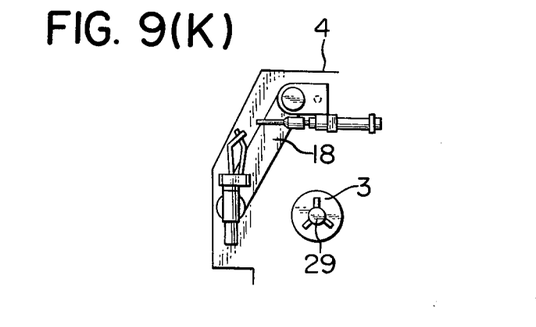

Now the operation of the flexible loader apparatus, the construction of which has been described above, will be explained referring to FIGS. 9(A) to 9(K) which schematically represent the loader apparatus shown in FIG. 5 in a side elevational view and wherein FIG. 9(A) represents the state of the loader apparatus prior to its operation and from which state the splash guard 4 is opened. For this purpose, after the finger members 25 at the forward end of the arm 18 are engaged with an engaging member (not shown) provided in the splash guard 4, the arm 18 is moved in the axial line 9 of the main spindle although it is also possible to separately provide an air cylinder exclusively used for opening and closing the splash guard 4. Subsequently the arm 18 is moved back to a middle position. Then the wrist member 21 is rotated about the axial line 20 in the clockwise direction as viewed in the drawings and simultaneously the finger members 25 are opened. Subsequently, after the arm 18 is rotated in the counterclockwise direction around the axial line 17 so as to approach a workpiece 27 held by the chuck 3, the arm 18 is moved backwards along the axial line 9 of the main spindle to close the finger members 25 to grasp the machined workpiece 27. See FIG. 9(B). Upon grasping the workpiece 27, a signal to open the chuck is issued, resulting in the opening of the claws of the chuck 3. Then the arm 18 is moved forward in parallel with the axial line 17 so that the workpiece 27 is removed from the chuck 3. Subsequently the arm 18 is rotated clockwise about the axial line 17 and simultaneously the wrist member 21 is rotated counterclockwise about the axial line 20 so that the state shown in FIG. 9(C) is reached. Then the hand member 23 is rotated through 90° about the axial line 22 so that the state shown in FIG. 9(D) is reached. Further, upon rotation of the wrist member 21 about the axial line 20 the workpiece 27 is located above a flat conveyor 28 as shown in FIG. 9(E). After the finger members 25 are opened the wrist member 21 is restored to a position shown in FIG. 9(F), whereby the workpiece 27 is laid on the conveyor 28, and then the arm 18 is moved forward in parallel with the axial line 17 so as to approach another workpiece 29 on the conveyor 28, the workpiece 29 being grasped by the finger members 25, as shown in FIG. 9(G). Subsequently the wrist member 21 and the hand member 23 are rotated about the axial lines 20 and 22, respectively, so as to reach the state shown in FIG. 9(H). Further the wrist member 21 is rotated in the counterclockwise direction about the axial line 20, reaching the state shown in FIG. 9(I). Then the arm 18 is rotated about the axial line 17 so that, as shown in FIG. 9(J), the workpiece is directed to the chuck 3. Thereafter the arm 18 is moved rearwards along the axial line 17 until the workpiece 29 is introduced into the chuck 3, whereupon the claws of the chuck 3 are closed to grasp the workpiece 29. Then the finger members 25 are opened, the arm 18 being moved in the direction of the axial line 17 to its initial position while the workpiece 29 is grasped by the chuck 3 as shown in FIG. 9(K). In this case the splash guard 4 may be simultaneously closed by the movement of the arm 18. Thus the workpiece 29 is ready for machining.

As apparent from the foregoing, since in this embodiment the flexible loader apparatus is installed within the digitally controlled lathe, no extra space is required for the loader apparatus, the necessary floor area thus not being increased, and since almost all of the operations of the loader apparatus are carried out inside the splash guard 4 and the operations outside it are carried out remote from the operator, the degree of safety is raised to a very high level. Further, since the hand member 23 can be rotated through 90° about the axial line 22, as shown in FIGS. 9(A) to 9(K), in the case of a cylindrical workpiece, the workpiece laid on a flat conveyor 28 in an upright position can be grasped by the finger members 25 to be fed to the chuck or a machined workpiece can be returned to the flat conveyor 28 in an upright position. Therefore, there is no need to support a cylindrical workpiece using V-blocks, etc. as has been necessary heretofore. Moreover, since the hand member 23 can also be rotated by 180° about the axial line 22, the workpiece grasped by the finger members 25 can be released from the chuck 3 to be turned over and then be reinserted to be grasped by the chuck again.

The construction and the fundamental operations of the first embodiment of the present invention have been explained above, the following being an explanation of the method for its use according to the present invention.

It is necessary to vary the position to grasp a workpiece by the finger members, the position at which the chuck grasps the workpiece, the position at which the finger members grasp the machined workpiece, etc. depending on the shape, dimensions, etc. of the workpiece or the raw stock. Therefore, it is required that a controller for the loader apparatus has to be instructed with and remember the operations such as those shown in FIGS. 9(A) to 9(K) in connection with the respective workpieces to be machined. However, the operation required for carrying out this procedure is generally complicated, e.g. in the case of a conventional industrial robot, it has taken a very long time to cause the robot to be instructed and remember the corresponding operations necessary for the machining of the workpiece. Therefore, when a relatively small lot of workpieces is to be machined, if a general industrial robot is used, the ratio of the time required for instruction to the actual machining time becomes too large, so efficiency is very low.

Therefore, it is a further object of the present invention as stated above to provide a method for the use of the flexible loader apparatus according to the present invention which makes the change in operations of the flexible loader apparatus very easy.

The fundamental concept of the present invention in attaining this object resides generally in that the fundamental operations of the loader apparatus are fixed and invariable and only those operations which have to be changed as the workpiece is changed are modified.

Figure 10:
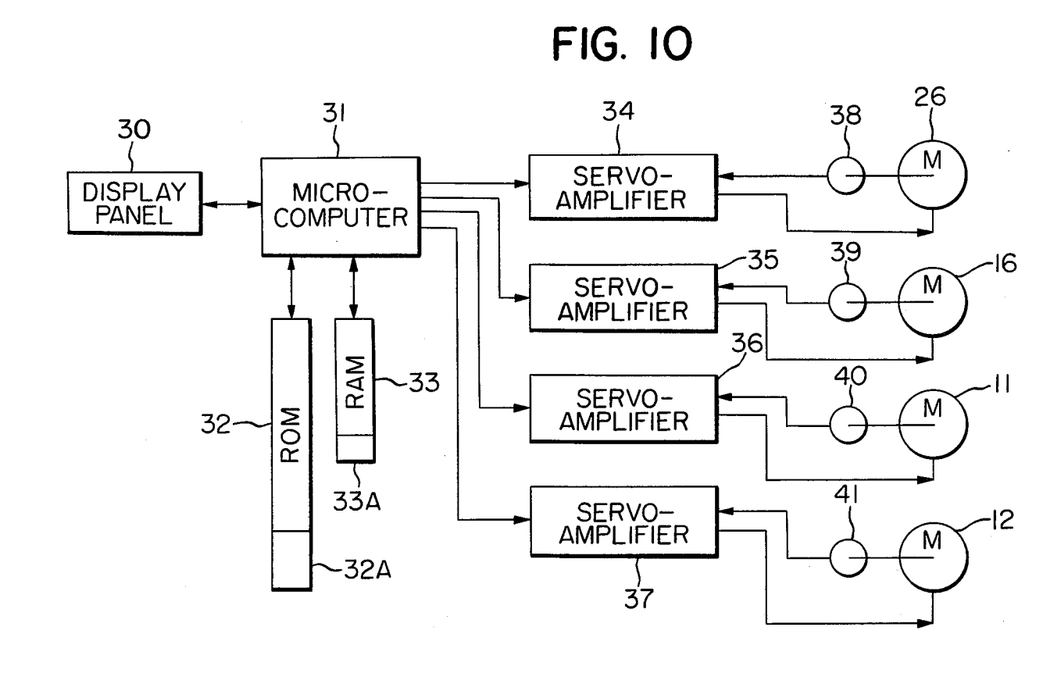
FIG. 10 is a block diagram of the controlling system for the flexible loader apparatus shown in FIGS. 3 to 8.

FIG. 10 shows a controller for the flexible loader apparatus according to the present invention in a block diagram. As shown in the drawing a display panel 30 is connected to a micro-computer 31 to which are connected a ROM, 32 and a RAM, 33. The ROM 32 memorizes a control program of the micro-computer 31 to control the loader apparatus. The area 32A of the ROM 32 memorizes the operational program of the loader apparatus such that the micro-computer 31 reads this program to produce an operational command for the loader apparatus. The RAM 33 operates in such a manner that at the time when the micro-computer 31 handles the data the RAM 33 changes the content of the data, memorizes the operational sequence, produces an operational command, and memorizes and corrects it. The operation memory area 33A of the RAM 33 changes the operations of the loader apparatus memorized in the area 32A into the content to be memorized in the area 33A. The operation commands from the micro-computer 31 are transmitted to servo-amplifiers 34, 35, 36 and 37 to drive the servo-motors 26, 16, 11 and 12, respectively. Feedback signals from pulse generators 38, 39, 40 and 41, provided in the servo-motors 26, 16, 11 and 12, respectively, are sent to the servo-amplifiers 34, 35, 36 and 37, respectively.

The flexible loader apparatus in accordance with the present invention is actuated by the controller as explained above and shown in FIG. 10. Now the operation will be explained somewhat more concretely, describing the program to be memorized in the area 32A.

In the area 32A, as is usual in a conventional digitally controlled machine tool, a program such as, for example, that described below is assumed to be contained:

|  |  |  |
|---|---|---|
| N11 | Z 200CR | 1. |
|  | X-50CR | 2. |
|  | Y-300CR | 3. |
|  | M 11CR | 4. |
|  | H 01CR | 5. |
|  | H 12CR | 6. |
|  | M 14CR | 7. |
|  | Z 100CR | 8. |

Step 1 is the operation No. 11, "Z 200" meaning that the arm 18 is to be moved in the direction of the axial line 9 of the main spindle by 200 pulses. "X-50" of step 2 means to rotate the arm 18 counterclockwise around the axial line 17 by 50 pulses, "Y-300" of step 3 means to rotate the wrist member 21 clockwise around the axial line 20 by 300 pulses, and "M 11" of step 4 means to open the chuck 3. "H 01" of step 5 is a command to instruct the operation and for this purpose, in the area 33A of the RAM 33 a memory area for "H 01" is provided. Originally nothing is memorized in this memory area for "H 01".

Figure 11:
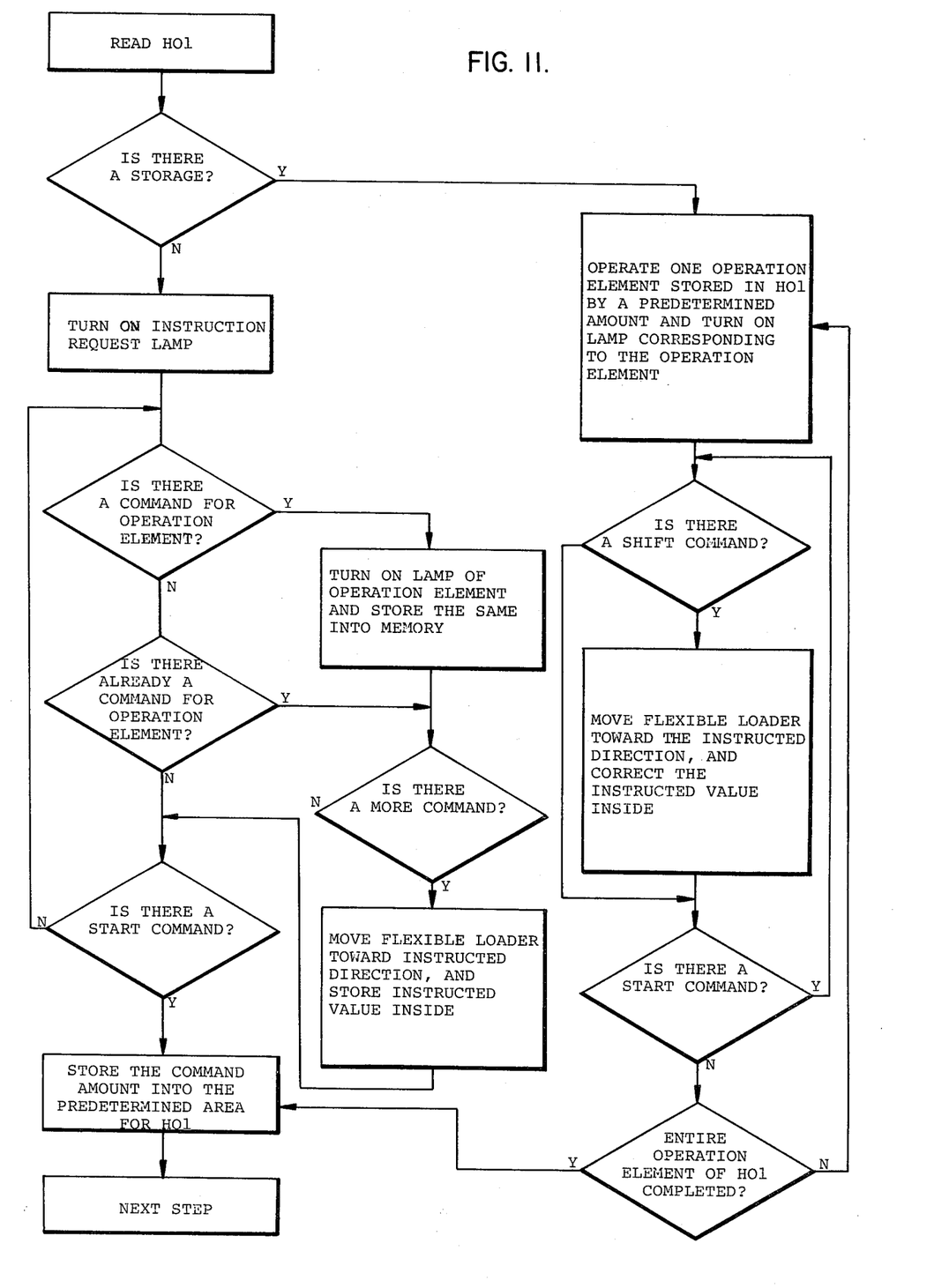
FIG. 11 is a flow chart for instructing the flexible loader apparatus shown in FIGS. 3 to 10 an operation to be carried out by the apparatus.

FIG. 11 is a flow chart for instructing the operations for "H 01". When "H 01" is read out from the area 32A of the ROM 32 it is determined whether or not there is a program for "H 01" within the area 33A of the corresponding RAM 33.

When there is a program, the respective servo-motors initiate the respective motions of the respective operational elements, i.e. the rotation of the hand member 23, the rotation of the wrist member 21, the rotation of the arm 18 and the movement of the arm 18, for the predetermined values, in accordance with the program. In the memory area provided for "H 01", a programs such as, for example, that described below will have been previously given:

W 23: Rotation of the hand member 23 about the axial line 22;

Y 12: Rotation of the wrist member 21 about the axial line 20;

X 8: Rotation of the arm 18 about the axial line 17; and

Z 40: Movement of the arm 18 in the direction of the axial line 5 of the main spindle.

In the automatic operation, after the "H 01" step is completed by sequentially carrying out the predetermined operations in accordance with this program, the next step 6 is entered.

At the time of the instructing operation, first the step "W 23" is carried out. Upon completion of the step "W 23", the lamp for the hand member in the display panel 30 is turned on to notify the completion, the load apparatus being at a standstill until the next starting command is given by the operator. The operator gives a command for movement, if necessary. By this command, the hand member 23 of the loader apparatus continues to rotate in the designated direction as long as the command is given. At a desired time, when the movement command is ceased, the command signal is corrected to that value, and when the starting command is given, the next step "Y 12" is effected. Upon completion of "Y 12" the lamp for the wrist member in the display panel 30 is turned on to notify the completion of "Y 12". The operator gives a movement command, if necessary, to change the movement value (command value) of the wrist member 21. Analogously, as to the command values for the rotation about the axial line 17 and the movement in the direction of the axial line 17 of the arm 18 they can be changed to be desired values. At the time of the completion of these operations the command values newly set are memorized in the area 33A, and the next step 6 is entered.

When no program is present in the memory area provided for "H 01" in the area 33A, the lamp requesting instruction is turned on in the display panel 30. Then the operator causes the memory area to memorize the command amounts successively for the respective operational elements according to the operational order. That is, when a specific operational element is designated, a lamp for this element is turned on, and when the command for the movement is given, the designated element is actuated in the commanded direction. The movement is stopped at a desired time, the amount of the movement being memorized. This procedure is carried out for each operational element, and after all of the operations have been memorized, the starting command is given, the next step 6 being entered. In accordance with "M 12" of step 6 the chuck 3 grasps the workpiece. In accordance with "M 14" of step 7 the chuck 3 opens; in accordance with "Z 100" of step 8 the arm 18 moves along the axial line 17 to fully remove the workpiece from the chuck 3.

Although the above is an explanation of a part of the program, as to the operation of grasping the raw stock 29 from the flat conveyor 28 the program for the operational command for this operation only can be changed, easily, separately from the other fixed operations. The procedure for this is similar to that described above, e.g. a memory area for "H 02" can be used.

Next a double hand device which is another embodiment of the present invention will be explained in reference to FIGS. 12 to 15 wherein instead of one pair of finger members 25 as shown in FIGS. 1 to 6 in connection with the first embodiment of the present invention, two pairs of finger members 131 are provided.

Figure 12:
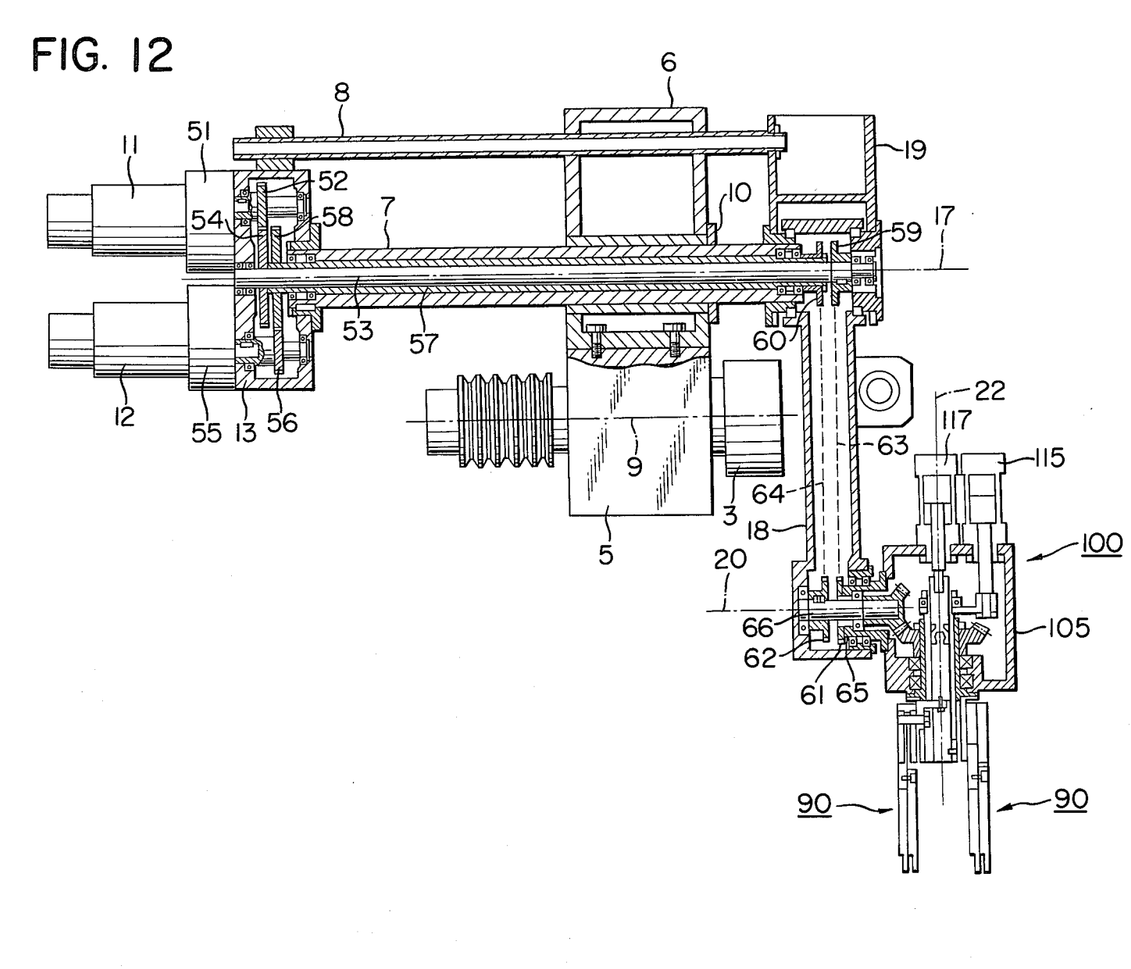
FIG. 12 is a view similar to FIG. 6 but disclosing a double hand device for the flexible loader apparatus as another embodiment of the present invention.

First, referring to FIG. 12 wherein in a general view is shown a flexible loader apparatus with a double-hand device mounted to a lathe, a base 6 is fixedly secured to a headstock 5 of the lathe which rotatively supports a main spindle provided with a chuck 3 at its forward end, slides 7 and 8 being mounted to the base 6 so as to be shiftable along an axial line 17 in parallel with the axial line 9 of the main spindle. Mounted to the slides 7, 8 at their one ends are servo-motors 11 and 12 and a gear box 13 to step up or down the outputs therefrom and to transfer them further. A nut, not shown, is mounted to the underside of the gear box 13, and a threaded spindle such as a ball screw, not shown, in threaded engagement with the nut extends parallel with the axial line 17 of the slides 7 and 8 to the base 6 so that, upon rotation of the spindle by a servo-motor (not shown) mounted to the base 6, the slides 7 and 8 are adapted to be shifted along their axial line 17. The output of the servo-motor 11 is operatively connected through a reduction gear box 51 associated therewith to a gear 52 within the gear box 13, the gear 52 being in mesh with a gear 54 which is in turn secured to one end of a shaft 53, which passes through the slide 7, while the output shaft of the servo-motor 12 is operatively connected through a reduction gear box 55 associated therewith to a gear 56 within the gear box 13, the gear 56 being in mesh with a gear 58 secured to a hollow shaft 57, coaxial with the shaft 53, at its one end. The shaft 53 and the hollow shaft 57 are provided with sprockets 59 and 60, respectively, at their other ends.

Fixedly secured to the slides 7 and 8 at their other ends is a support member 19 within which is rotatively mounted a hollow arm 18 at its base end so as to be swingable about the axial line 17 of the slide 7. The arm 18 carries a pivot (not shown) near its base end so as to be rotatable about an axial line in parallel with the axial line 17, a nut assembly (not shown) being secured to the pivot at its one end, and the support member 19 carries another pivot (not shown) so as to be rotatable about an axial line in parallel with the axial line 17, a servo-motor (not shown) being secured to the pivot at its one end, and a threaded shaft (not shown) which is in engagement with the nut assembly is fixedly secured to the shaft of the servo-motor. Thus, when the servo-motor is operated, the arm 18 is swung about the axial line 17 through the threaded shaft and the nut assembly in engagement therewith. However, in FIG. 13 the details of the actuating mechanism for the arm 18 have been omitted as they are the same as those already explained in reference to FIGS. 7 and 8.

Figure 13:
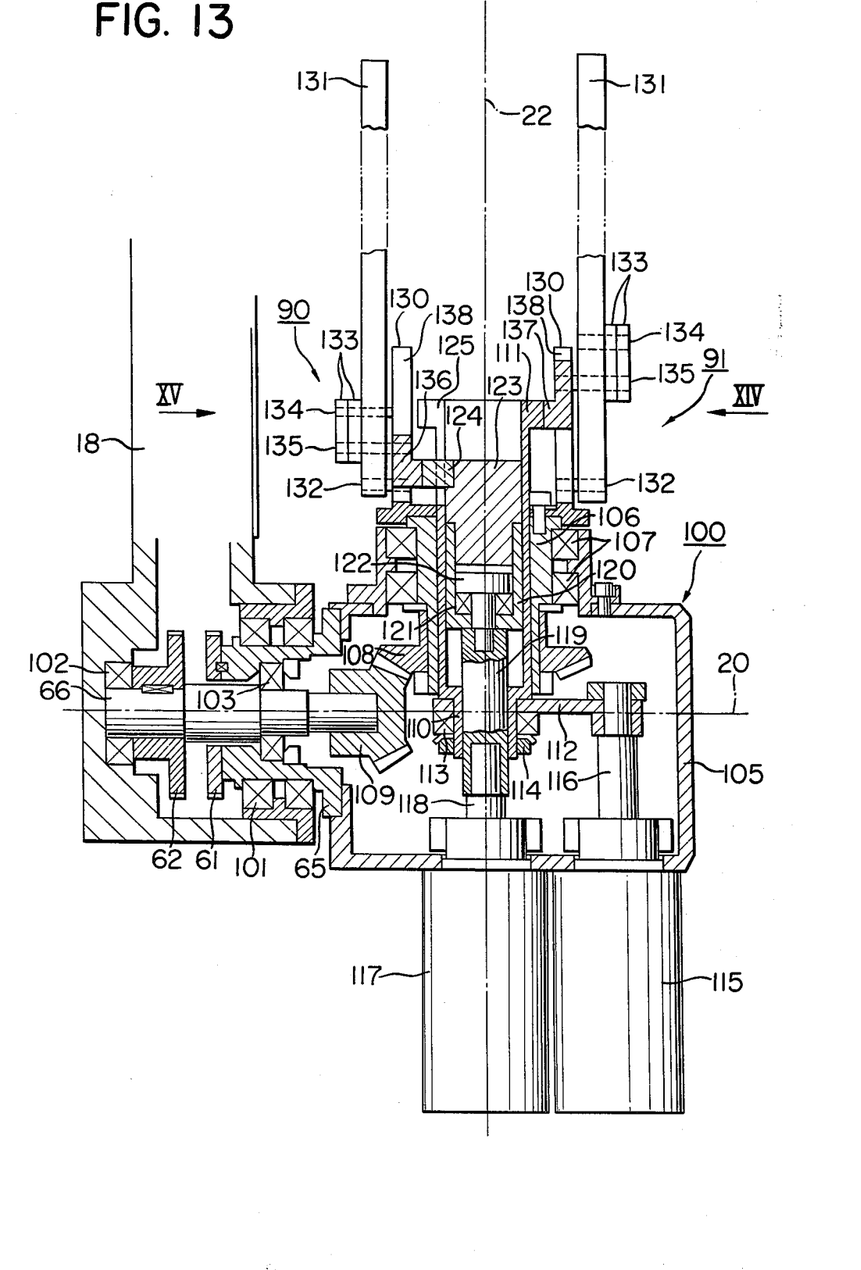
FIG. 13 is an enlarged front elevational sectional view of the apparatus seen at the lower part of FIG. 12, but rotated through substantially 180°.

Mounted to the arm 18 near its free end are a hollow shaft 65, which is mounted so as to be rotatable about an axial line 20 in parallel with the axial line 17 of the slide 7, and a stub shaft 66, which is mounted so as to be rotatable within the hollow shaft 65 coaxially thereto, sprockets 61 and 62 being fixedly secured to the hollow shaft 65 and the stub shaft 66, respectively, with the sprockets 61 and 62 operatively connected to the shaft 53 and the hollow shaft 57 within the slide 7, respectively, through the sprockets 59 and 60, respectively, and chains 63 and 64, respectively. Thus, it will be appreciated that, similar to the first embodiment shown in FIGS. 1 to 11, upon operation of the servo-motors 11 and 12 connected to the slides 7 and 8 at their one ends, the hollow shaft 65 and the stub shaft 66 are respectively rotated through the sprockets and the chains.

As shown in FIG. 13 the hollow shaft 65 is mounted to the arm 18 by bearings 101 so as to be rotatable about the axial line 20, the stub shaft 66 being rotatively journaled within the hollow shaft 65 with the one end thereof being rotatively supported by the arm 18 through a bearing 102 and the mid portion thereof being rotatively supported by a bearing 103 mounted within the hollow shaft 64. Fixedly secured to the hollow shaft 65 is a gear box or a wrist member 105 so as to be rotatable about the axial line 20, together with the shaft 65, relative to the arm 18. A second hollow shaft 106 is mounted within the gear box 105 by bearings 107 so as to be rotatable about an axial line 22 orthogonal to the axial line 20. Fixedly secured to the second hollow shaft 106 at its lower end is a bevel gear 108 which is in mesh with a bevel gear 109 that is fixedly secured to the stub shaft 66 at its one end. Thus, when the stub shaft 66 is rotated through the transmission system as described above from the main spindle side of the lathe, the second hollow shaft 106 is adapted to be rotated through the bevel gears 108 and 109 by the stub shaft 66. An outer sleeve 111 is shiftably received within the second hollow shaft 106, the sleeve 111 having a small diameter portion 110 at its lower part, and a shifter 112 is connected to the small diameter portion 110 at right angles to the axial line 22 of the second hollow shaft 106 and is rotatively secured to the outer sleeve 111 through a thrust bearing 113 by a lock nut 114 screwed onto the small diameter portion 110. The shifter 112 is fixedly connected to the upper end of a piston rod 116 of a fluid cylinder 115 which is fixedly secured to the gear box 105 at its bottom, the piston rod being slidable in the direction parallel to the axial line 22. A shaft 119 is mounted within the bore of the small diameter portion 110 so as to be shiftable in the direction of the axial line 22, the shaft 119 being secured to the upper end of a piston rod 118 of a fluid cylinder 117 that is secured to the bottom of the gear box 105 in the direction of the axial line 22. An inner sleeve 120 shiftably received within the bore of the outer sleeve 111 is fixedly secured at its lower end to the upper end of the shaft 119 with the bottom of sleeve 120 being rotatively secured to shaft 119 by a support shaft 122 threaded into the shaft 119 with a thrust bearing 121 interposed between shaft 119 and sleeve 120. A shaft 123 shiftably received within the bore of the outer sleeve 111 is fixedly secured at its lower end to the upper end portion of the inner sleeve 120. A connector 124 is fixedly secured to the upper end of the shaft 123 at right angles to the axial line 22 of the second hollow shaft 106 so as to project radially through a slot 125 formed in the wall of the outer sleeve 111 at its upper portion in the direction of the axial line 22.

Figure 15:
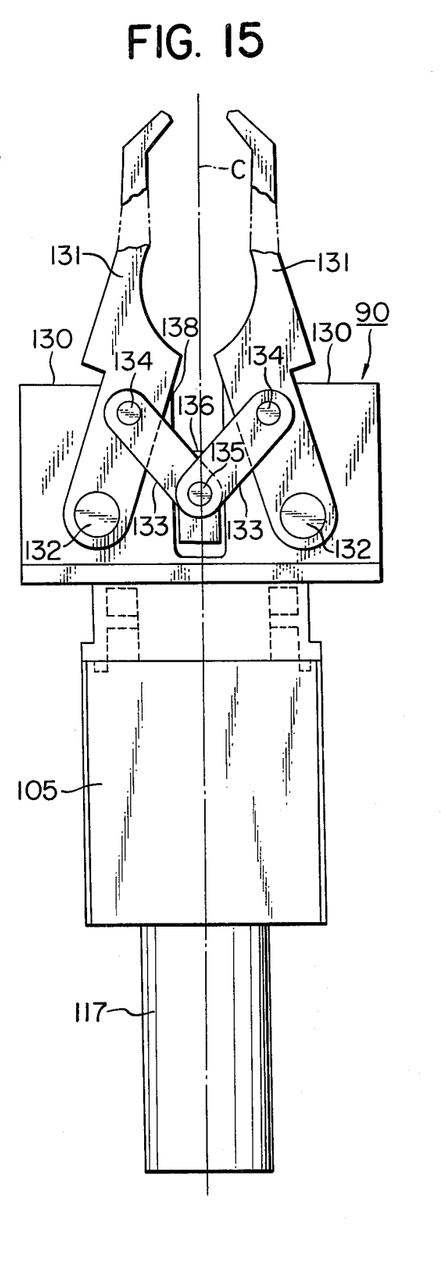
FIG. 15 is a view of the apparatus shown in FIG. 13 as viewed in the direction shown by the arrow XV therein.

Provided on the upper end surface of the second hollow shaft 106 projecting out of the gear box 105 are a pair of hands 90 each adapted to grasp a workpiece. That is, provided on the upper surface of the second hollow shaft 106 is a pair of vertical walls 130 serving as the base plates for the hands 90 such that they extend parallel with each other and at the same time are in symmetry with respect to the axial line 22, and each of the walls 130 carries on its outer surface a pair of finger members 131 so that the finger members 131 are spaced apart from each other and are equi-distant from a plane C containing the axial lines 20 and 22, and are pivotally connected to the walls 130 at their lower end portions by pivots 132 as shown in FIGS. 15 and 16. Each of the finger members 131 of the respective pairs rotatively carries at a portion above the pivot 132 a connecting link 133 having its one end pivoted on a pivot 134, the other ends of the connecting links 133 belonging to the same pair being pivotably connected together by a pivot 135, one of the pivots 135 being fixedly secured to a connecting member 136 secured to the connector 124 which is secured to the shaft 123, and the other of the pivots 135 being fixedly secured to a connecting member 137 secured to the upper end of the outer sleeve 111. The connecting members 136 and 137 are adapted to be shiftable in the direction of the axial line 22 within slots 138 which are respectively formed in the vertical walls 130 in symmetry with respect to the plane C. At this point it will be appreciated that each pair of finger members 131 of the respective hands 90 can be operated independently so as to be opened and closed by means of the fluid cylinders 115 and 117, respectively, as will be explained later.

When the stub shaft 66 is rotated through the transmission system as stated above, the second hollow shaft 106 is rotated within the gear box 105 about the axial line 22 through the action of the bevel gears 109 and 108 meshing with each other. Therefore, the vertical walls 130 fixedly secured to the second hollow shaft 106 are rotated about the axial line 22 together with the pairs of finger members 131 pivotally mounted thereto. In this case, the outer sleeve 111 and the shaft 123 as well as the inner sleeve 120 and the shaft 119, both integrally secured to the shaft 123 are also rotated, but since the outer sleeve 111 and the inner sleeve 120 are connected to the fluid cylinder 115 and 117, respectively, through the thrust bearings 113 and 121, respectively, their rotations are not interfered with by the fluid cylinders 115, 117.

When the hollow shaft 65 is rotated through the transmission system as above described about the axial line 22 relative to the arm 18, the gear box 105 is rotated about the axial line 20, resulting in the rotation of the pairs of finger members 131 as a whole about the axial line 20.

Figure 14:
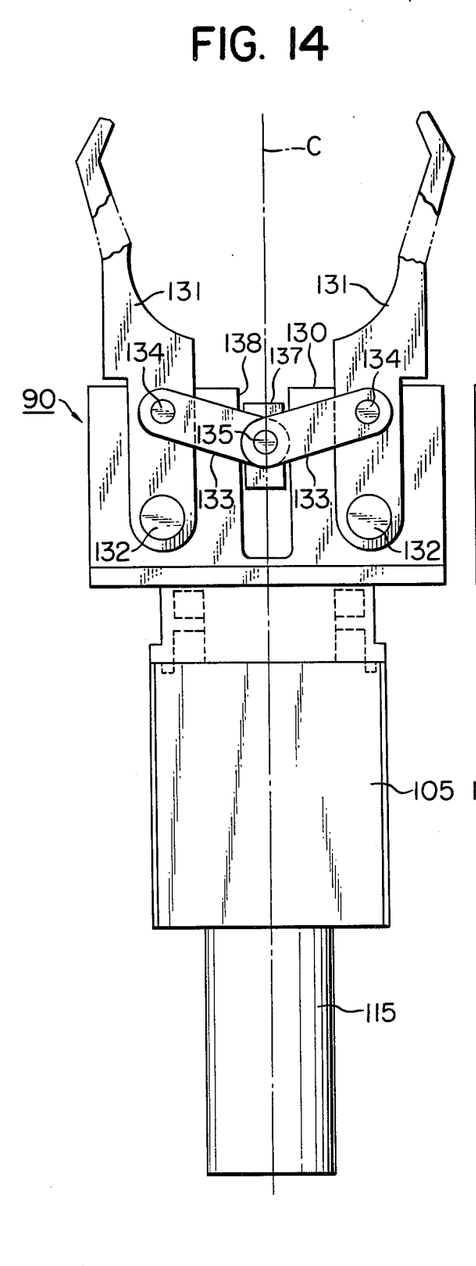
FIG. 14 is a view of the apparatus shown in FIG. 13 as viewed in the direction shown by the arrow XIV therein.

The operation of the embodiment shown in FIGS. 13 to 15 having such a constitution as explained so far, will be explained below.

When the piston rod 116 or 118 of the fluid cylinder 115 or 117 is moved in the direction of the axial line 22 by the operation of the fluid cylinder 115 or 117, the outer sleeve 111 is shifted in the direction of the axial line 22 through the shifter 112 relative to the second hollow shaft 106, or the shaft 123 is shifted through the inner sleeve 120 in the direction of the axial line 22 relative to the outer sleeve 111, whereby the connecting member 137 rigidly connected to the outer sleeve 111 or the connecting member 136 rigidly connected to the shaft 123 through the connector 124 shifts along the slot 138 formed in the vertical wall 130 in the direction of the axial line 22. Accordingly, either one of the pairs of finger members 131, which have the one ends of the connecting links 135, each pivotally connected at the other end to the respective fingers 131 by the pivot 134, pivotally connected together by the pivot 135 to the connecting member 136 or 137, can pivot about the pivots 132 pivotally connecting the base end portion to the vertical wall 130, whereby the closing or opening of the free end portions of the finger members 131 takes place as shown in FIG. 15 or 16.

Since this embodiment has the constitution and operation as described above, when it is used with a lathe, while one pair of finger members 131 holds a workpiece, the other pair of finger members 131 can grasp the machined workpiece. Therefore, when the arm 18 is shifted towards the axial line 9 of the main spindle of the lathe with one pair of finger members 131 holding a workpiece, the other pair of finger member 131 can grasp the machined workpiece held by the chuck 3 to withdraw the former from the latter after the latter has been released, and, after the pair of finger members 131 are rotated about the axial line 22 through 180° by the revolution of the second hollow shaft 106, when the arm 18 is again shifted towards the chuck 3, the workpiece held by one of the pairs of finger members 131 can be transferred to the chuck 3. Therefore, in accordance with this embodiment the exchange of a machined workpiece for a raw workpiece can be carried out more rapidly than in the case of the first embodiment. Further, this embodiment additionally has the advantage that since the two fluid cylinders 115 and 117 do not revolve about the axial line 22 when the pairs of finger members 131 are to be rotated about the axial line 22, the piping and (or) wiring to operate the fluid cylinders 115 and 117 does not get twisted when the finger members 131 are rotated about the axial line 22.

It is to be understood that although certain forms of the present invention have been illustrated and described, it is not to be limited thereto so far as such limitations are included in the following claims.

I claim:

1. A flexible loader apparatus for a machine tool having a main spindle, comprising:
 a base means for being mounted near a headstock of the machine tool;
 a hollow slide slidably mounted in said base means and shiftable in a direction parallel to the longitudinal axis of the main spindle of the machine tool;
 a slide driving mechanism for driving said slide;
 a support member secured to one end of said slide;
 a hollow arm means having a base end pivotally mounted on said support member for pivotal movement about a first axis parallel to the axis of the main spindle;

means mounted on said support member and connected to said arm for pivoting said arm around said first axis;

a wrist means including a shaft pivotally mounted on the free end of said arm means for rotation about a second axis parallel to the axis of the main spindle;

a hand means including a shaft rotatably mounted on said wrist means for rotation about a third axis orthogonal to said second axis;

finger means mounted on said hand means and extending substantially parallel with said third axis and being openable and closable to grasp a workpiece; and a transmission system for driving said wrist means and said hand means together or independently of each other and having two servo motors at the other end of said hollow slide, transmission shafts respectively driven by said servo motors and extending through said hollow slide to said arm, transmission chains extending from said transmission shafts through said hollow arm, one being connected to said wrist means shaft for rotating said wrist means shaft, and a hand means transmission shaft extending from said arm to said hand means shaft and drivingly connected thereto and to which the other transmission chain is connected for rotating said hand means transmission shaft and through said hand means transmission shaft rotating said hand means shaft and thus said hand means.

2. A flexible loader as claimed in claim 1 wherein said slide driving mechanism a further servo motor mounted on said base means, a first threaded shaft having one end driven by said further servo-motor, and a nut assembly secured to said slides at the ends corresponding to the other end of the threaded shaft and threadably engaging with said first threaded shaft.

3. A flexible loader apparatus as claimed in claim 1 wherein said arm pivoting means comprises a first pivot means mounted on said arm means near the pivotally mounted end so as to be rotatable about a first pivot line parallel to said first axial line, a further nut assembly fixedly secured to said first pivot means, a second pivot means mounted on said support member near said arm means so as to be rotatable about a second pivot line parallel to said first axial line, a still further servo motor mounted on said second pivot means, and a second threaded shaft means fixedly connected to said still further servo motor and being in engagement with said further nut assembly.

4. A flexible loader apparatus as claimed in claim 1 wherein said hand means shaft is a hollow shaft rotatively mounted on said wrist means, and a pair of meshed bevel gear means fixedly secured to said hand means transmission shaft and said hollow hand means shaft, respectively.

5. A flexible loader apparatus as claimed in claim 4 wherein said finger means comprises a pair of finger elements each pivotally connected to said hand means, and finger operating means comprising a first cylinder means mounted on said wrist means, a linkage means extending through said hollow hand means shaft and operatively connecting the piston rod of said first cylinder means and said finger elements.

6. A flexible loader apparatus as claimed in claim 4 wherein said finger means comprises two pairs of finger elements, first and second upright support members separately pivotally mounting said finger elements on said hand means, respectively, in opposed positions, and a finger operating sleeve is shiftably mounted within said hollow hand means shaft, a finger operating shaft means being shiftably mounted in said hollow hand means shaft, a second and third cylinder means each secured to said wrist means and being operatively connected to said sleeve means and said shaft means, and linkage means operatively connecting the respective pairs of said finger elements to said sleeve means and said shaft means, respectively.

7. A flexible loader apparatus as claimed in claim 1 further comprising a first and second sprocket means mounted on the respective transmission shafts and thrid and fourth sprocket means mounted on said wrist means shaft and said hand means transmission shaft, respectively, said transmission chains being around said first and third and said second and fourth sprocket means, respectively, and the rotational ratio between said first and third sprocket means and between said second and fourth sprocket means being identical.

8. A flexible loader apparatus as claimed in claim 1 further comprising a first and second sprocket means mounted on the respective transmission shafts and third and fourth sprocket means mounted on said wrist means shaft and said hand means transmission shaft, respectively, said transmission chains being around said first and third and said second and fourth sprocket means, respectively, the number of teeth of all of said first, second, third and fourth sprocket means being identical, and reduction gear means connecting said two servo motors to said transmission shafts and having identical reduction ratios.

9. A flexible loader apparatus as claimed in claim 1 further comprising a control means connected to said two servo motors for controlling said servo motors for, when the first servo motor starts to rotate the first transmission shaft in one direction at a given speed, the second servo motor is driven to rotate the second transmission shaft means in the same direction and at the same speed.

* * * * *